LOGIC CIRCUITRY
Filed May 27, 1959 3 Sheets-Sheet 1
FIG. 1A
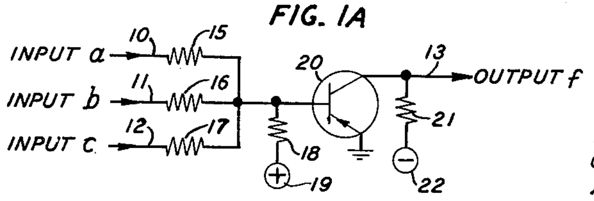
FIG. 1B
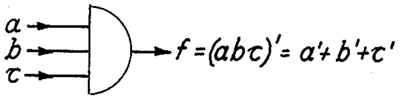
FIG. 2A
| | | | | | |
|---|---|---|---|---|---|
| MINUEND | x | 0 | 0 | 1 | 1 |
| SUBTRAHEND | y | 0 | 1 | 0 | 1 |
| DIFFERENCE | d | 0 | 1 | 1 | 0 |
| BORROW | b | 0 | 1 | 0 | 0 |
$b_{i_1} = x'y\,b'_{i-1}$
FIG. 2B
| | | | | | |
|---|---|---|---|---|---|
| MINUEND | x | Ø1 | Ø1 | 1̸0 | 1̸0 |
| SUBTRAHEND | y | 0 | 1 | 0 | 1 |
| DIFFERENCE | d | 1 | 0 | 0 | 1 |
| BORROW | b | 1 | 1 | 0 | 1 |
$b_{i_2} = x'y'b_{i-1} + x'y\,b_{i-1} + xy\,b_{i-1}$
$= b_{i-1}(x'y' + x'y + xy)$
FIG. 3A
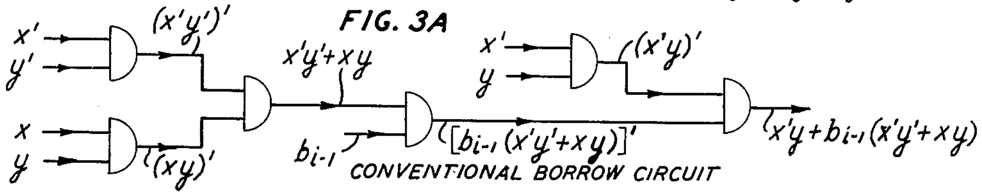
FIG. 3B
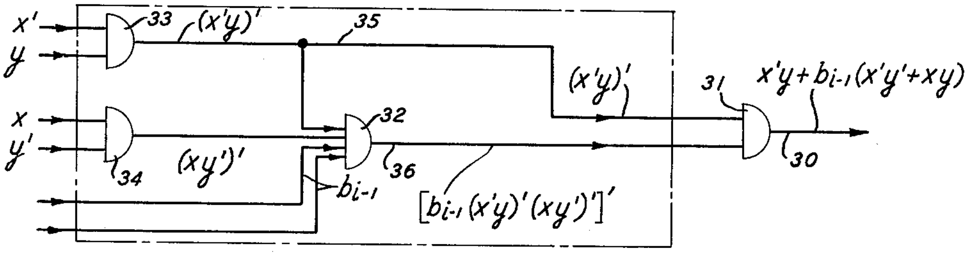
FIG. 3C
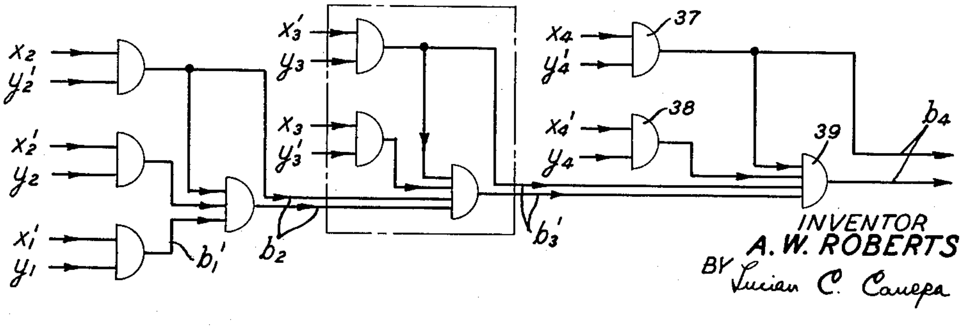
INVENTOR
A. W. ROBERTS
BY Lucian C. Canepa
ATTORNEY INVENTOR
A. W. ROBERTS
BY Lucian C. Canepa
ATTORNEY FIG. 6A
| | | | | | |
|---|---|---|---|---|---|
| CARRY | $c_{i-1}$ | 0 | 0 | 0 | 0 |
| ADDEND | $m$ | 0 | 0 | 1 | 1 |
| AUGEND | $n$ | 0 | 1 | 0 | 1 |
| SUM | $s$ | 0 | 1 | 1 | 0 |
| CARRY | $c_{i-1}$ | 0 | 0 | 0 | 1 |
$c_{i_1} = m n c'_{i-1}$
FIG. 6B
| | | | | | |
|---|---|---|---|---|---|
| CARRY | $c_{i-1}$ | 1 | 1 | 1 | 1 |
| ADDEND | $m$ | 0 | 0 | 1 | 1 |
| AUGEND | $n$ | 0 | 1 | 0 | 1 |
| SUM | $s$ | 1 | 0 | 0 | 1 |
| CARRY | $c_{i-2}$ | 0 | 1 | 1 | 1 |
$c_{i_2} = c_{i-1}(m'n+mn'+mn)$
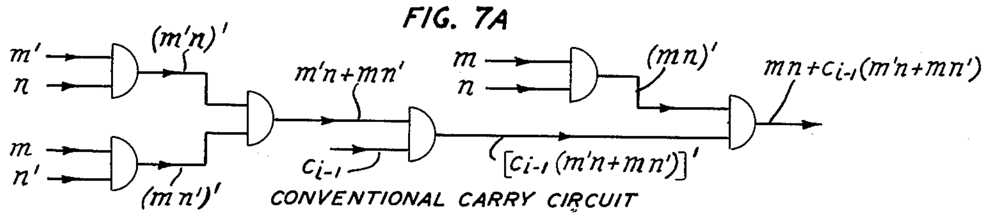
FIG. 7A
FIG. 7B
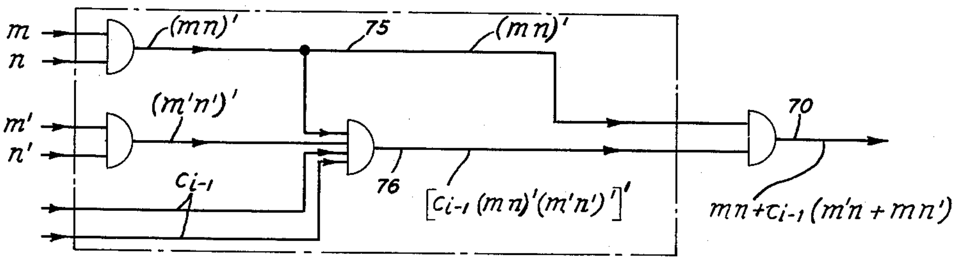
FIG. 7C
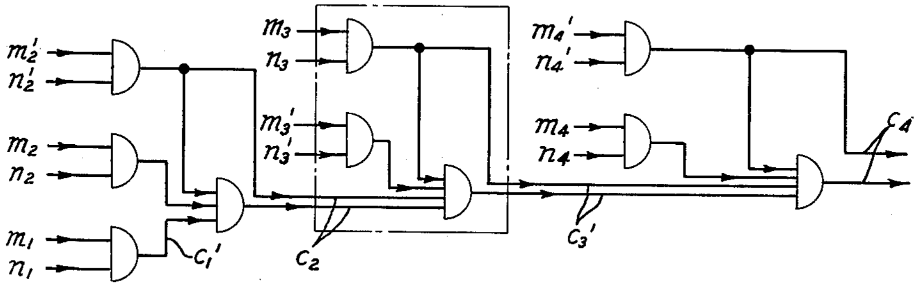
INVENTOR
A. W. ROBERTS
BY Lucian C. Canepa
ATTORNEY 3,084,861

LOGIC CIRCUITRY

Allen W. Roberts, South Plainfield, N.J., assignor to Bell Telephone Laboratories, Incorporated, a corporation of New York Filed May 27, 1959, Ser. No. 816,216

13 Claims. (Cl. 235—175)

This invention relates to the processing of digital information and more particularly to borrow or carry propagation circuitry.

It is required of one type of subtracter circuitry commonly included in digital information processing systems that it be capable of generating and propagating information which is representative of a borrow, i.e., the circuitry must be capable of borrowing a number from the next more significant place when in a given place the number in the minuend is smaller than the number in the subtrahend.

Digital information processing systems also commonly include adders which perform additions of two or more numbers by means of various combinations of logic circuits. It is necessary that these circuits be capable of generating and propagating information which is representative of a carry, i.e., the circuits must be capable of carrying a number to the next more significant place when in a given place the sum of the number in the addend and that in the augend is equal to or greater than the base or radix of the number system being employed.

In recent years several logic technologies have been developed from which subtracters, adders and other logic circuitry for a digital information processing system may be constructed. Typical of these logic technologies are transistor resistor logic or T.R.L., which includes a basic logic circuit or building block comprising a transistor and a plurality of resistors; transistor diode logic or T.D.L., which includes a basic logic circuit or building block comprising a transistor and a plurality of diodes; and low level logic or L.L.L., which includes a basic logic circuit or building block also comprising a transistor and a plurality of diodes. Each of these transistor logic circuits, as well as other known transistor logic circuits not specifically enumerated, has advantages and disadvantages for various applications when factors such as speed of operation, power requirement, size, reliability, economy, simplicity of design and others are considered in the aggregate.

An object of the present invention is improved logic circuitry.

More specifically, an object of the present invention is faster and more economical borrow or carry propagation logic circuitry.

These and other objects of the present invention are realized in a specific illustrative embodiment thereof which comprises a plurality of logic or function generating stages arranged in a linear array. Each of the stages except the first and last ones of the array includes circuitry for receiving digital information and converting it to signals representative of the partially-developed prime (i.e., the primed components) of a desired borrow or carry function. The first stage receives digital information and converts it to signals representative of the prime of a desired borrow or carry function, and the last stage of the array fully develops and inverts the partially-developed prime signals coupled thereto.

A plurality of electrical paths extends between adjacent ones, except the first and second ones, of the stages, thereby to propagate the representative signals along the array. A single electrical path interconnects the first and second stages of the array.

Borrow or carry propagation circuits made in accordance with the principles of the present invention include as components thereof fewer of the basic logic building blocks or units and shorter propagation paths than do borrow or carry propagation circuits made in accordance with a straightforward application of the principles of the known logic technologies to the problem of constructing borrow or carry circuits. Accordingly, circuits embodying the principles of this invention are faster and more economical than their conventional counterparts.

A feature of this invention is a digital data processing system comprising a plurality of generating stages arranged in a linear array, circuitry for coupling digital information to each of the stages, circuitry interconnecting adjacent ones of the stages, each of the stages except the first and last ones including circuitry for developing signals which represent the partially-developed prime of a desired electrical function, and circuitry for coupling the signals developed by a given stage to the portion of the interconnecting circuitry which extends to a next following stage in the array, the first one of the stages including circuitry for developing signals representative of the prime of a desired electrical function.

Another feature of this invention is a combination including a plurality of logic stages arranged in a linear array, each of the stages including circuitry for developing signals representative of the partially-developed prime of a desired electrical function, and circuitry including a plurality of electrical paths interconnecting adjacent ones of the stages for propagating the signals therebetween.

A further feature of the present invention is a combination comprising a function generating stage, circuitry for coupling information to stage, the stage including circuitry for deriving from the information signals representative of the primed components of a desired electrical function, and output circuitry including a plurality of electrical paths for carrying the signals from the stage.

Still another feature of this invention is the stage-to-stage propagation on a plurality of electrical paths of information which is representative of a desired electrical function.

The major significance of the novel arrangements of the present invention is that they are characterized by greater speed and economy than has heretofore been realized in known borrow or carry propagation circuitry.

A complete understanding of the present invention and of the above and other features thereof may be gained from a consideration of the following detailed description of illustrative embodiments thereof given with reference to the accompanying drawing, in which:

FIG. 1A is a diagram of the basic circuit or building block of T.R.L., out of which illustrative embodiments of the present invention may be formed;

FIG. 1B is a symbolic depiction of the circuit of FIG. 1A;

FIG. 2A is a subtraction table in the binary number system, specifying for a given place the value of the difference and borrow for each of the four possible combinations of minuend and subtrahend for the case where a borrow did not occur in a place immediately preceding the given one;

FIG. 2B is another subtraction table in the binary number system, specifying for a given place the value of the difference and borrow for each of the four possible combinations of minuend and subtrahend for the case where a borrow did occur in an immediately preceding place;

FIG. 3A is a diagram of a conventional borrow circuit;

FIG. 3B is a diagram of a borrow circuit made in accordance with the principles of the present invention;

FIG. 3C is a borrow chain made up of circuits of the type shown in FIG. 3B;

FIG. 6A is an adder table in the binary number system, specifying for a given place the value of the sum and carry for each of the four possible combinations of addend and augend for the case where a carry did not occur in a place immediately preceding the given one;

FIG. 6B is another adder table in the binary number system, specifying for a given place the value of the sum and carry for each of the four possible combinations of addend and augend for the case where a carry did occur in a place immediately preceding the given one;

FIG. 7A is a diagram of a conventional carry circuit;

FIG. 7B is a diagram of a carry circuit made in accordance with the principles of the present invention; and FIG. 7C is a carry chain made up of circuits of the type shown in FIG. 7B.

Figure 4:
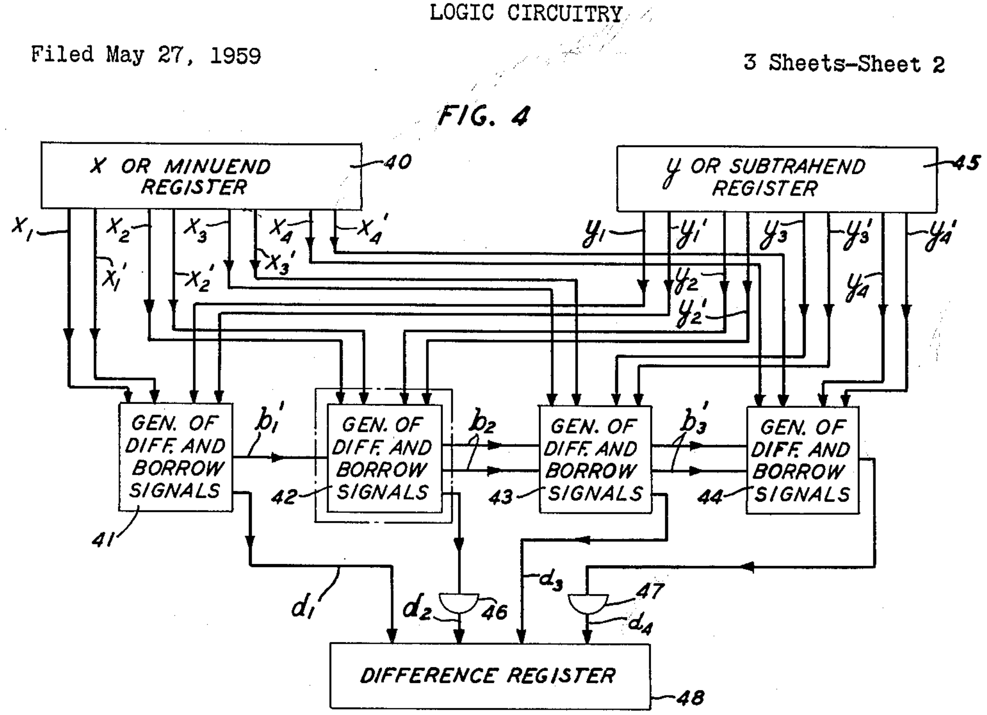
FIG. 4 is a block diagram of a subtracter which includes as a component part thereof the borrow chain of FIG. 3C.

Referring now to the drawing, illustrative embodiments of the principles of the invention as applied to transistor resistor logic will be described. It is to be understood, however, that the present invention is not limited in application to this particular logic technologies. FIG. 1A shows one of the basic logic building blocks of transistor resistor logic from which illustrative embodiments of the present invention are constructed. A general description of transistor resistor logic circuits may be obtained by referring to an article entitled "Transistor NOR Circuit Design" by W. D. Rowe and G. H. Royer in volume 76, part I, of the Transactions of the American Institute of Electrical Engineers, Communications and Electronics, July 1957, pages 263–267.

The logic circuit shown in FIG. 1A includes three leads 10, 11 and 12 to which may be coupled input signals $a$, $b$ and $c$, respectively, whereby there is produced on a lead 13 an output signal $f$. The circuit also includes input resistors 15, 16 and 17, a base bias resistor 18, a positive source 19 of direct current power, a p-n-p transistor 20, a collector bias resistor 21, and a negative source 22 of direct current power.

If a voltage near ground potential is assumed to represent the binary value "1" and if a high negative voltage is designated "0," the circuit of FIG. 1A performs the function of providing on the lead 13 a "1" if a "0" is applied to any one or more of the input leads 10, 11 and 12. On the other hand, a "0" output signal results only if every one of the leads 10, 11 and 12 has a "1" coupled thereto. Such a configuration is commonly referred to as an AND-NOT circuit.

FIG. 1B, which is a symbolic depiction of the circuit of FIG. 1A, includes the notation $f=(abc)'=a'+b'+c'$, which is a Boolean algebra expression indicating that the input and output signals of the basic T.R.L. circuit are related in the manner specified in the immediately preceding paragraph.

Before proceeding to a description of the tables of FIGS. 2A and 2B, it may be helpful to state clearly the manner in which the illustrative embodiments of the invention will be presented herein. First, with the aid of the tables of FIGS. 2A and 2B, a generic Boolean algebra expression for a borrow signal will be derived. Then there will be described a conventional arrangement, shown in FIG. 3A, for providing the derived borrow signal, which arrangement results from a straightforward stacking together of the basic T.R.L. blocks. Next, a borrow circuit made in accordance with the principles of this invention, shown in FIG. 3B, will be described. Then, with the aid of FIG. 3C, there will be disclosed an illustrative manner in which a plurality of the basic borrow circuits or stages of the type shown in FIG. 3B may be combined to form a borrow chain. Next, FIG. 4, which shows a subtracter in which borrow circuits made in acordance with the principles of this invention may be included, will be described. Then, a specific portion of FIG. 4 will be disclosed in detail, which specific portion is shown in FIG. 5. Lastly, with the aid of FIGS. 6A, 6B, 7B and 7C, the application of the principles of the present invention to carry propagation circuits will be described.

Turning now to FIG. 2A, there is shown for a given digit position or place a binary subtraction table for the case where a borrow did not occur in a place immediately preceding the given one. It is seen from the table that a borrow occurs in the single instance when the minuend is less than the subtrahend, i.e., when the minuend is "0" and the subtrahend is "1."

FIG. 2B represents for a given place the various possible differences and borrows for the case where a borrow did occur in an immediately preceding place. Note that each of the original minuends of FIG. 2B has been lined out and replaced by another number, thereby to indicate by the new or unlined number the change in the minuend which results from a borrow in a preceding place.

The combining of an expression which represents the relationships listed in FIG. 2A with one which represents the relationships of FIG. 2B will result in a generic borrow expression that will cover all possibilities for a given place, whether or not a preceding borrow is involved.

If one wishes a borrow expression for the $i$th place and if the two components of that expression are designated $b_{i_1}$ and $b_{i_2}$ then from FIG. 2A it is seen that $b_{i_1}=x'yb_{i'-1}$, that is, there will be a $b_{i_1}$ component, viz., a "1," of the generic borrow expression if the minuend $x$ is "0" and if the subtrahend $y$ is "1" and, further, if, as was originally assumed in constructing FIG. 2A, no borrow occurred in the place immediately preceding the $i$th one, i.e., the $i-1$th one.

Similarly, from FIG. 2B it is seen that the $b_{i_2}$ component of the generic borrow expression is equal to $b_{i_2}=x'y'b_{i-1}+x'yb_{i-1}+xyb_{i-1}$, which means, in other terms, that there will be a $b_{i_2}$ component if $x$ is "0" and $y$ is "0" and a borrow occurred in the $i-1$th position, or if $x$ is "0" and $y$ is "1" and a borrow occurred in the $i-1$th place, or if $x$ is "1" and $y$ is "1" and a borrow occurred in the $i-1$th place. As indicated in FIG. 2B, the aforespecified expression for $b_{i_2}$ may be simplified to the form $b_{i_2}=b_{i-1}(x'y'+x'y+xy)$.

The generic borrow expression is simply the sum of $b_{i_1}$ and $b_{i_2}$ and can be found through straightforward Boolean algebra manipulations to be equal to $$x'y+b_{i-1}(x'y'+xy)$$

The basic problem here involved then is to provide a circuit configuration whose output will be of the form of the generic borrow expression.

FIG. 3A shows such a circuit configuration, which was constructed by starting with the desired final borrow expression (shown at the extreme right of FIG. 3A) and working toward the left in a step-by-step fashion which simply required the breaking down of each final or intermediate output expression into its component parts until simple inputs of the form $x$, $x'$, $y$, $y'$, and $b_{i-1}$ were sufficient to produce the desired intermediate outputs. Such an approach produces a configuration which includes six basic T.R.L. circuits and wherein some of the simple input signals must be propagated along a series path including four of the basic T.R.L. circuits.

The circuit of FIG. 3B, which is a specific borrow circuit illustrative of the principles of the present invention, processes input signals $x$, $x'$, $y$, $y'$, and $b_{i-1}$ to provide on an output lead 30 thereof a signal of the form $$x'y+b_{i-1}(x'y'+xy)$$

which, as developed above, is the desired generic borrow expression. The circuit of FIG. 3B includes only four AND-NOT units 31, 32, 33 and 34, and the longest path along which the input signals must propagate includes only three units. Accordingly, in contrast to the arrangement shown in FIG. 3A, the circuit of FIG. 3B is more economical in its use of AND-NOT units and, having shorter propagation paths, is faster, i.e., an input signal becomes available on a final output path in less time.

The information appearing on leads 35 and 36 of FIG. 3B is representative of the prime or complement of the generic borrow function. More specifically, the information appearing on the leads 35 and 36 is the partially-developed prime or inverse of the desired output function, that is, the information appearing on the lead 35, viz., $(x'y)'$, is the prime of one component, viz., $x'y$, of the generic borrow function or expression, and the information appearing on the lead 36, viz., $[b_{i-1}(x'y)'(xy')']'$, is the prime of the other component, viz., $b_{i-1}(x'y'+xy)$, of the generic borrow function. [Note that by means of the techniques of Boolean algebra $b_{i-1}(x'y)'(xy')'$ can easily be shown to be equal to $b_{i-1}(x'y'+xy)$.] Hence the information appearing on the leads 35 and 36 comprises the primed components of the desired function or, in other words, the partially-deveolped prime of the desired function. It is noted that the term "the desired function" is to be construed to refer to either a generic borrow or carry function of the type developed herein or to the inverse of such a function.

FIG. 3C depicts a borrow chain whose links or stages are derived from the borrow circuit of FIG. 3B. The designations $b_1'$, $b_2$, $b_3'$, and $b_4$ employed in FIG. 3C relate, respectively, to a borrow in the first, second, third and fourth digit places. In particular, note that the portion of FIG. 3C enclosed within dashed lines corresponds to that portion of FIG. 3B which is similarly enclosed and that the electrical paths of FIG. 3C designated $b_3'$ are equivalent to the leads 35 and 36 of FIG. 3B. Thus, information is carried by means of the leads $b_3'$ from the enclosed stage of FIG. 3C to the next following stage, which includes the units 37, 38 and 39. Each of the units 37 and 38 has applied thereto minuend and subtrahend signals and produces an output which is coupled to the unit 39. The unit 39 inverts and develops the $b_3'$ information applied thereto and combines it with the outputs of the units 37 and 38 to produce one component of $b_4$, the other component thereof coming directly from the output of the unit 37. In turn, the leads marked $b_4$ may be coupled to another borrow stage of the form of the one enclosed within dashed lines.

Figure 5:
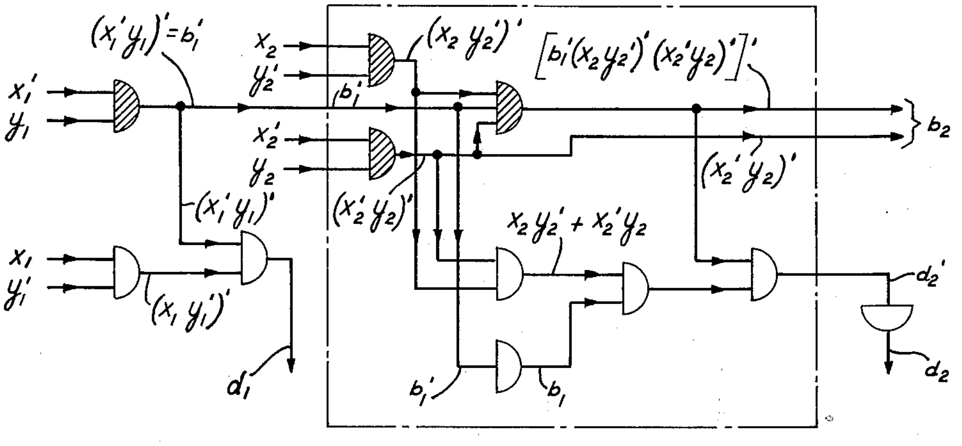
FIG. 5 is a detailed showing of the borrow and difference circuitry included within the dash-dot box of FIG. 4.

FIG. 4 shows a type of subtracter in which borrow circuits and chains made in accordance with the principles of this invention may be included. The subtracter includes an $x$ or minuend register 40, a $y$ or subtrahend register 45, and a register or unit 48 which is designed to register the difference between the numbers stored in the registers 40 and 45. The specific subtracter shown in FIG. 4 is capable of subtracting four-digit numbers.

The register 40 is arranged so as to provide in a first digit position on a lead marked $x_1$ a signal representative of the first digit of the minuend. In that same digit position the register 40 provides on a lead marked $x_1'$ a signal representative of the inverse of the first digit of the minuend. At the same time, i.e., in the first digit position or place, the register 45 provides on leads marked $y_1$ and $y_1'$ signals representative, respectively, of the first digit of the subtrahend and of its inverse. Similarly, the registers 40 and 45 provide signals representative of each of the other digits of the minuend and subtrahend and of their inverses.

The subtracter of FIG. 4 includes four generators 41, 42, 43 and 44 each of which comprises circuitry for receiving minuend and subtrahend information, and previous borrow information, if any, and converting this information to a signal representative of a borrow and to another one representative of a digit of the difference. It is noted that each of the generators 42 and 44 in fact produces the inverse of a digit of the difference. Accordingly, the subtracter includes AND-NOT units 46 and 47, thereby to convert $d_2'$ and $d_4'$ to $d_2$ and $d_4$, respectively.

It is to be noted that borrow information in the arrangement of FIG. 4 is transmitted from the generator 42 to the generator 43, and from the generator 43 to the generator 44, on a plurality of electrical paths, in accordance with the principles of this invention.

The generator 42 of the subtracter of FIG. 4 is enclosed within a dash-dot box. Entering the box are five leads, one marked $b_1'$ and the others marked $x_2$, $x_2'$, $y_2$ and $y_2'$, respectively. Leaving the box are three leads, one carrying difference information and the other two, marked $b_2$, carrying to the generator 43 the partially-developed prime of a borrow function.

FIG. 5 shows the details of the circuitry included within the dash-dot box of FIG. 4. To facilitate a clear comprehension of FIG. 5 the symbols of the AND-NOT units therein forming the borrow propagation circuitry have been cross-hatched. The other AND-NOT units therein are part of the circuitry which generates difference information.

As mentioned above, the principles of this invention are also applicable to carry propagation circuitry. In this connection, FIGS. 6A and 6B are binary addition tables closely patterned after the subtraction tables of FIGS. 2A and 2B.

The table of FIG. 6A lists for a given digit place the various possible values of sums and carries for the case where a carry did not occur in a place immediately preceding the given one, while the table of FIG. 6B is directed to the case wherein a carry occurred in a preceding place. The two expressions representing the carries of the tables of FIGS. 6A and 6B are included in those figures and are respectively designated $c_{i_1}$ and $c_{i_2}$. The total or generic carry expressions is derived from the sum of these two expressions and is equal to $$mn+c_{i-1}(m'n+mn')$$

FIG. 7A is a conventional carry circuit, which was constructed in the same straightforward step-by-step fashion described above as having been involved in the design of the conventional borrow circuit of FIG. 3A.

FIG. 7B, which is a carry circuit including fewer AND-NOT units and shorter propagation paths than the arrangement of FIG. 7A, is another specific illustrative embodiment of the principles of this invention. The embodiment processes input signals $m$, $m'$, $n$, $n'$ and $c_{i-1}$ to provide on an output lead 70 thereof a signal of the form $mn+c_{i-1}(m'n+mn')$, which, as developed above, is the desired generic carry expression.

The information appearing on leads 75 and 76 of FIG. 7B is representative of the generic carry function. More specifically, the information appearing on the leads 75 and 76 is the partially-developed prime or inverse of the desired output function.

FIG. 7C depicts a carry chain or linear array whose links or stages are of the form of the borrow circuit shown in FIG. 7B. The designations $c_1'$, $c_2$, $c_3'$ and $c_4$ in FIG. 7B relate to a carry in the first, second, third and fourth digit places, respectively. In particular, note that the portion of FIG. 7C enclosed within dashed lines corresponds to that portion of FIG. 7B which is similarly enclosed and that the electrical paths of FIG. 7C designated $c_3'$ are equivalent to the leads 75 and 76 of FIG. 7B.

The carry chain of FIG. 7C may, for example, be included as an integral part of an adder of a type basically similar in form to the subtracter of FIG. 4.

It is to be understood that the above-described arrangements are only illustrative of the application of the principles of the present invention. Numerous other arrangements may be devised by those skilled in the art without departing from the spirit and scope of the invention. For example, borrow or carry chains in which the stage-to-stage propagation of information takes place on more than two electrical paths are clearly within the purview of the principles of this invention and may easily be implemented in the light of the disclosure herein.

Furthermore, although the present invention has been illustratively described as applied to T.R.L. circuitry, it is to be emphasized that the principles of the present invention are applicable to logic technologies other than T.R.L. In accordance with the disclosure herein borrow and carry arrangements illustratively embodying the principles of this invention may be easily formed from the basic building blocks of these other technologies. Transistor diode logic, as described in an article entitled "Designing Low Level, High-speed Semiconductor Logic Circuits" in the 1957 Institute of Radio Engineers Wescon Convention Record, volume 1, part 2, pages 3 through 9, and low level logic, as disclosed in a copending application of W. B. Cagle and W. H. Chen, Serial No. 642,818, filed February 27, 1957, now Patent 2,964,653, issued December 13, 1960, are illustrative of such other technologies.

What is claimed is:

1. In combination in a digital data processing system, a plurality of generating stages arranged in a linear array, means for coupling digital information to each of said stages, means interconnecting adjacent ones of said stages, each of said stages except the first and last ones including a plurality of NOR logic gates for developing signals which represent the complement of a Boolean subterm of the generic borrow function, and means for coupling the signals developed by a given stage to the portion of said interconnecting means which extends to a next following stage in said array, the first one of said stages including a second plurality of NOR logic gates for developing signals which represent the complement of the generic borrow function.

2. In combination in a digital data processing system, a plurality of stages, means for coupling information representative of a plurality of digit values to said stages respectively, the first stage including a plurality of NOR logic gates for developing from said coupled information first signals representative of the complement of a Boolean subterm of a first generic borrow function, means for coupling said first signals to the second one of said stages, said second stage including a second plurality of NOR logic gates for developing from said coupled information and said first signals second signals representative of the complement of a Boolean subterm of a second generic borrow function, means for coupling said second signals to the third one of said stages, said third stage and each of the succeeding stages except the last one including a third plurality of NOR logic gates for developing from said coupled information and the signals coupled thereto from an immediately preceding stage signals representative of the complement of a Boolean subterm of the generic borrow function.

3. In combination in a data processing system, a plurality of logic stages arranged in a linear array, each of said stages including a plurality of NOR logic gates for developing signals representative of the complement of a Boolean subterm of the generic borrow function, and means including a plurality of electrical paths interconnecting adjacent ones of said stages for propagating said signals therebetween.

4. In combination in a data processing system, a plurality of borrow function generation stages arranged in a linear array, the first one of said stages including a plurality of NOR logic gates for developing signals representative of the complement of the generic borrow function, each of the others except the last of said stages including a second plurality of NOR logic gates for developing signals representative of the complement of a Boolean subterm of the generic borrow function, and signal path means interconnecting adjacent ones of said stages.

5. In a data processing system the combination comprising a plurality of borrow function generation stages arranged in a linear array, means for coupling minuend, subtrahend and previous borrow information to each of said stages, each of said stages including a plurality of NOR logic gates for processing said coupled information and for deriving therefrom signals representative of the complement of a Boolean subterm of the generic borrow function, and means including a plurality of electrical paths interconnecting adjacent ones of said stages for propagating said signals from stage to stage.

6. In combination in a data processing system, a plurality of carry function generation stages arranged in a linear array, the first one of said stages including a plurality of NOR logic gates for developing signals representative of the complement of the generic carry function, each of the others except the last of said stages including a second plurality of NOR logic gates for developing signals representative of the complement of a Boolean subterm of the generic carry function, and signal path means interconnecting adjacent ones of said stages.

7. In a data processing system the combination comprising a plurality of carry function generation stages arranged in a linear array, means for coupling addend, augend and previous carry information to each of said stages, each of said stages including a plurality of NOR logic gates for processing said coupled information and for deriving therefrom signals representative of the complement of a Boolean subterm of the generic carry function, and means including a plurality of electrical paths interconnecting adjacent ones of said stages for propagating said signals from stage to stage.

8. In combination in a data processing system, a function generating stage, means for coupling information to said stage, said stage including a plurality of NOR logic gates for deriving from said information signals representative of the complemented Boolean subterms of the generic carry function, and output means including a plurality of electrical paths for carrying said signals from said stage.

9. In a data processing system, a function generator comprising in combination a plurality of input leads, a plurality of output leads, a plurality of NOR logic gates responsive to digital information signals on said input leads for producing a first signal representing the complement of a Boolean subterm of the generic carry function, a second plurality of NOR logic gates responsive to said digital information signals on said input leads, to said first signal, and to a plurality of signals representing the complemented Boolean subterms of a previous generic carry function for producing a second signal representing the complement of a second Boolean subterm of said generic carry function.

10. In combination in a data processing system, a borrow function generating stage, means for coupling minuend, subtrahend and previous borrow information to said stage, said stage including a plurality of NOR logic gates for deriving from said information signals representative of the complemented Boolean subterm of the generic borrow function, and output means including a plurality of electrical paths for propagating said signals from said stage.

11. In combination in a data processing system, a carry function generating stage, means for coupling addend, augend and previous carry information to said stage, said stage including a plurality of NOR logic gates for deriving from said information signals representative of the complemented Boolean subterms of the generic carry function, and output means including a plurality of electrical paths for propagating said signals from said stage.

12. In a computer for performing the mathematical calculation of subtraction with plural digit minuend and subtrahend numbers, a plurality of borrow function signal generators each associated with a respective digit position of said minuend and subtrahend numbers, means for applying digits of like significance of said minuend and subtrahend numbers to respective ones of said signal generators, means comprising a plurality of electrical paths interconnecting adjacent ones of said signal generators for propagating borrow information signals therebetween, each of said borrow function signal generators including means for deriving signals representing the complement of a first and a second Boolean subterm of the generic borrow function, said last-named means in each of said signal generators comprising a plurality of NOR logic gates responsive to said minuend and subtrahend digits applied thereto for generating a first signal representing the complement of said first Boolean subterm of said generic borrow function, a second plurality of NOR logic gates responsive to said digits of said minuend and subtrahend numbers applied thereto and signals representing the complements of said first and said second Boolean subterm of said generic borrow function produced by the one of said signal generators associated with the preceding digit position of said minuend and subtrahend numbers for generating a second signal representing the complement of said second Boolean subterm of said generic borrow function, and means for applying said first and said second signals to the ones of said electrical paths connected to the one of said signal generators associated with the next succeeding digit position of said minuend and subtrahend numbers.

13. In a computer for performing the mathematical calculation of addition with plural digit addend and augend numbers, a plurality of carry function signal generators each associated with a respective digit position of said addend and augend numbers, means for applying digits of like significance of said addend and augend numbers to respective ones of said signal generators, means comprising a plurality of electrical paths interconnecting adjacent ones of said signal generators for propagating carry information signals therebetween, each of said carry function signal generators including means for deriving signals representing the complement of a first and a second Boolean subterm of the generic carry function, said last-named means in each of said signal generators comprising a plurality of NOR logic gates responsive to said addend and augend digits applied thereto for generating a first signal representing the complement of said first Boolean subterm of said generic carry function, a second plurality of NOR logic gates responsive to said digits of said addend and augend numbers applied thereto and signals representing the complements of said first and said second Boolean subterm of said generic carry function produced by the one of said signal generators associated with the preceding digit position of said addend and augend numbers for generating a second signal representing the complement of said second Boolean subterm of said generic carry function, and means for applying said first and said second signals to the ones of said electrical paths connected to the one of said signal generators associated with the next suceeding digit position of said addend and augend numbers.

References Cited in the file of this patent

UNITED STATES PATENTS

| | | |
|---|---|---|
| 2,679,977 | Andrews | June 1, 1954 |
| 2,837,278 | Schreiner et al. | June 3, 1958 |
| 2,926,850 | Richards | Mar. 1, 1960 |
| 2,966,305 | Rosenberger | Dec. 27, 1960 |